(No Model.)
J. R. TODD.
BRANDING TOOL.
No. 487,304. Patented Dec. 6, 1892.
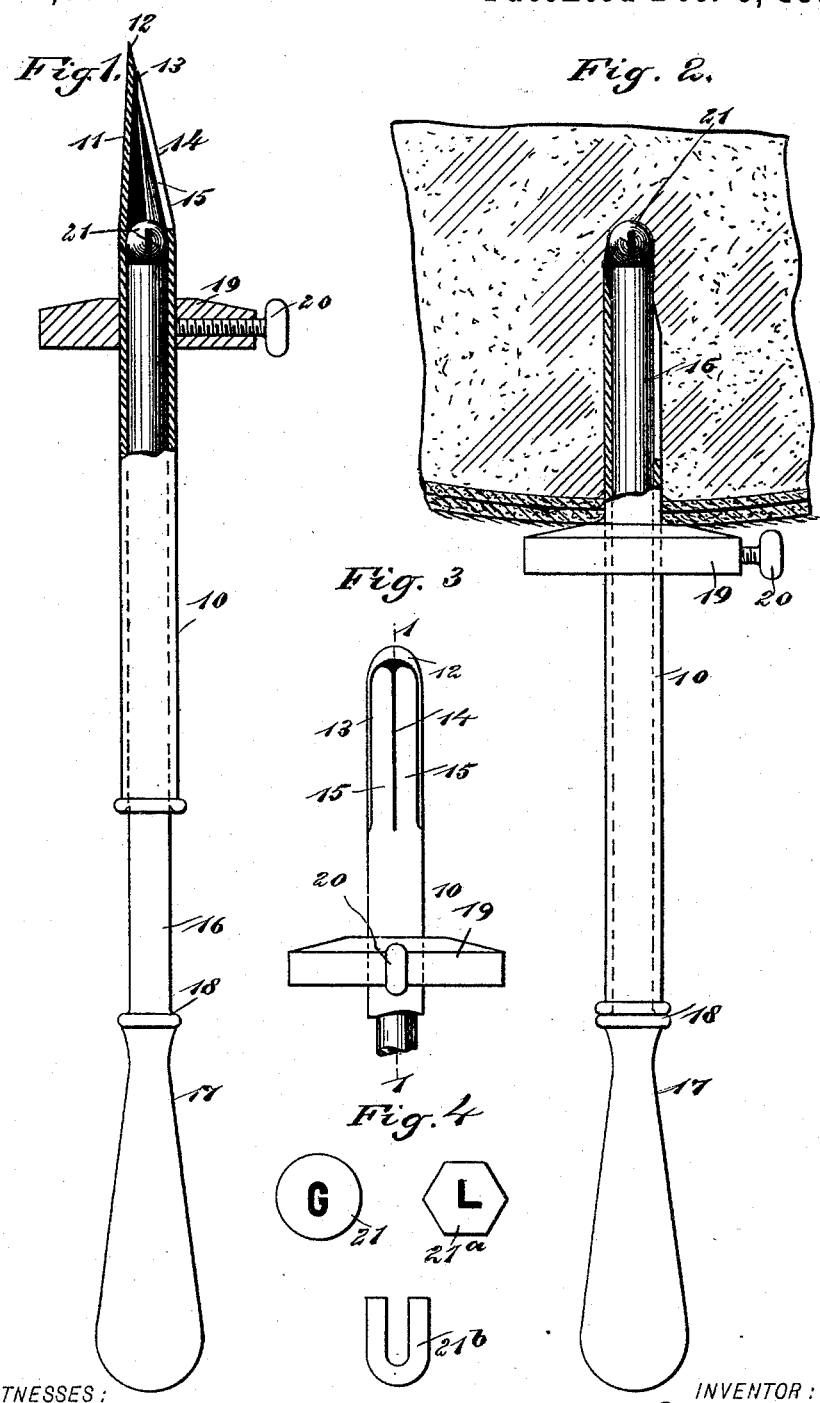
WITNESSES:
J. A. Bergstrom
C. Sedgwick
INVENTOR:
J. R. Todd
BY Munn & Co.
ATTORNEYS

UNITED STATES PATENT OFFICE.

JOHN R. TODD, OF GLENROCK, WYOMING.

BRANDING-TOOL.

SPECIFICATION forming part of Letters Patent No. 487,304, dated December 6, 1892.

Application filed January 12, 1892. Serial No. 417,821. (No model.)

*To all whom it may concern:*

Be it known that I, JOHN R. TODD, of Glenrock, in the county of Converse and State of Wyoming, have invented a new and Improved Tool for Branding, of which the following is a full, clear, and exact description.

My invention relates to an improved tool for branding cattle, so as to distinguish them from others. On the cattle-ranges in the western part of the United States the cattle run in a practically wild state, and their owners recognize them by certain brands which are applied in a well-known way, but rustlers and cattle-thieves are in the habit of branding over the cattle and either running them off of the range or killing them and selling the beef.

The object of my invention is to produce a simple tool by means of which the cattle may be branded in such a way that the brand cannot be counterfeited, and also to produce a tool for branding which will enable the cattle to be branded without seriously injuring them.

To this end my invention consists in a tool which will be hereinafter described and claimed.

Reference is to be had to the accompanying drawings, forming a part of this specification, in which similar figures of reference indicate corresponding parts in all the views.

Figure 1 is a side elevation of the tool embodying my invention, the view being partly in section on the line 1 1 in Fig. 3. Fig. 2 is a broken side elevation, partly in section, showing the tool as applied to the flesh of an animal. Fig. 3 is a broken plan view of the branding-tube, and Fig. 4 shows several forms of branding-tags which may be inserted in the flesh of an animal.

The branding-tool is provided with a tube 10, which is flattened at one end, as shown at 11, and terminates at this end in a point 12. The tube is split, as shown at 13 and 14, so as to form spring members 15, which members are so shaped that their points will normally lie flatwise upon the flattened portion 11, and the tube will thus have a single point which will enable it to be easily thrust into the side of an animal. A plunger 16 is held to slide in the tube and is provided with a handle 17, by means of which it is operated, a shoulder 18 at the junction of the plunger and handle limiting the inward movement of the plunger, and the plunger is of such a length that when pushed inward to its limit it will spread the closed end of the tube and permit the passage of a tag through said end. A gage 19 is held to slide on the tube and is fixed in position by a set-screw 20, which extends through the gage and impinges on the tube, and this gage is intended to limit the distance to which the tube is thrust into the animal.

The tags used in this tool may be of a spherical shape, as shown at 21 in Fig. 4, may be hexagonal like the tag 21$^a$, U shape like the tag 21$^b$, or of any other distinguishing shape, and may be marked with letters, as shown in Fig. 4, or other devices to render their identification easy.

To use the instrument, the plunger 16 is withdrawn, a tag is placed in the tube, and the plunger placed in after it, and then the pointed end of the tube is plunged into an animal until the gage 19 rests upon the animal's hide, and the plunger 16 is then forced inward, thus driving the tag inward through the tube and pushing it into the flesh of the animal. The tool is then withdrawn, and the fingers 15 spring back to place ready for another operation. The flesh of the animal quickly heals, leaving the tag embedded therein.

If desired, random numbers of tags may be placed on various animals—that is to say, one tag may be sometimes used and at other times three or more may be used—and consequently if by any chance the rustlers or thieves should find one tag they would not know but that others were present and could not find out except by mutilating the animal, so that they would be sure to be detected.

The manner in which the buried tags serve as a means of identification is as follows: It is well known that in all the stock-raising States of the West there are State associations which look after the interests of the stock-raisers, and in some cases the State does this to a certain extent, and my idea is to have the State or an association adopt this method of branding, and also some particular brand, and then offer a reward for any tags found in beef. It is obvious that these tags would not be found in most cases until the beef was consumed; but it does not usually pass through many hands, and when the tag was found it would be an easy matter to trace back the beef to its original place—that is, to the point where the creature was killed, or at least sold, and in this way the thief or rustler could usually be captured.

Having thus described my invention, I claim as new and desire to secure by Letters Patent—

1. A branding-tool comprising a tube having one end flattened and pointed and provided with springs the points of which rest upon the said flattened portion, and a plunger in the tube, substantially as described.

2. A branding-tool comprising a tube having one end flattened and split, a plunger held to slide in the tube, and a gage adjustably mounted upon the tube, substantially as described.

JOHN R. TODD.

Witnesses:
JOHN BLESSING,
WYATT F. FARRAR.